's Patent Office 3,135,655
Patented June 2, 1964

3,135,655
POLYACETYLENIC HALIDES AS PESTICIDES
John H. Wotiz and Charles G. Parsons, Mentor, and Bobby F. Adams, Painesville, Ohio, assignors to Diamond Alkali Company, Cleveland, Ohio, a corporation of Delaware
No Drawing. Filed Sept. 7, 1960, Ser. No. 54,341
7 Claims. (Cl. 167—22)

This invention relates to novel halogen-terminated linear polyacetylenic compounds, their preparation and use.

Broadly, this invention relates to linear polyacetylenic compounds (polyynes) of the structure:

(I)

$$M^1 \begin{bmatrix} J \\ L \end{bmatrix} C \equiv C - \left(CH_2\right)_a \left(R^1\right)_b \left(CH_2\right)_c \Big]_d C \equiv C - \left(CH_2\right)_e \left(R^2\right)_f \left(CH_2\right)_g \Big]_y -halogen$$

wherein $M^1$ is hydrogen or the same or different haloalkyl radicals, i.e., alkyl radicals containing fluorine, chlorine, bromine, and/or iodine; $a$ is a number from 0 to 20, inclusive; $b$ is a number from 0 to 2, inclusive; $c$ is a number from 0 to 20, inclusive; $d$ is a number from 0 to 20, inclusive; $e$ is a number from 0 to 20, inclusive; $f$ is a number from 0 to 2, inclusive; $g$ is a number from 0 to 20, inclusive; $y$ is a number from 1 to 100; $R^1$ and $R^2$ are the same or different radicals selected from the group consisting of alkylene radicals, e.g., radicals having the structure $-C_mH_{2m}-$ (and corresponding branched chain radicals), wherein $m$ is a number from 1 to 50; arylene radicals, e.g.,

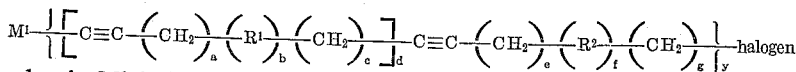

as well as corresponding ortho and meta radicals; oxygen; sulfur;

mercury; boron; boron-containing radicals such as

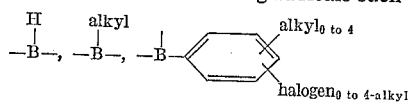

heterocyclic radicals such as

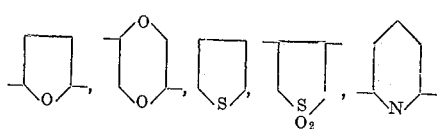

aryl-substituted alkylene radicals, e.g.

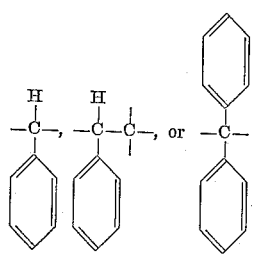

substituted alkylene radicals, e.g.

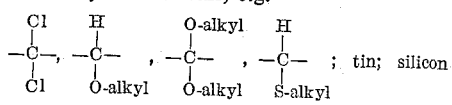

; tin; silicon

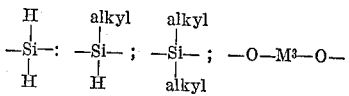

(wherein $M^3$ is selected from the group consisting of calcium, barium, zinc, tin, lead

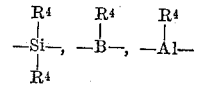

$R^4$ being selected from the group consisting of hydrogen, lower alkyl, i.e., up to about 10 carbon atoms, or aryl radicals, e.g., phenyl or naphthyl).

More specifically, the compounds of the present invention have the following structure;

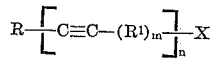

wherein R is hydrogen or haloalkyl, i.e., halogen-alkyl-; i.e., fluorine, chlorine, bromine, or iodine; $R^1$ is alkylene; X is halogen, i.e., fluorine, chlorine, bromine, or iodine; $m$ is a number from 1 to 10, inclusive; and $n$ is a number from 2 to 20, inclusive.

The terms "alkyl" and "alkylene," i.e., mono- and divalent radicals, respectively, as used in the specification and claims, unless otherwise defined, are intended to refer to various monovalent straight chain, e.g., $CH_3(CH_2)_{a^1}-$ groups, as well as branched chain derivatives thereof wherein $a^1$ is a number from 0 to 15; and to corresponding straight and branched chain divalent groups, e.g., $-(CH_2)_{b^1}-$ wherein $b^1$ is a number from 1 to 50. The term "lower" used with either "alkyl" or "alkylene" is intended to refer to radicals containing up to 10 carbon atoms.

Specific examples of "alkyl" and "alkylene radicals" are those containing 2 to 5 carbon atoms, e.g.;

| Alkylene | Alkyl |
|---|---|
| $-CH_2$ | $CH_3-$ |
| $-CH_2-CH_2-$ | $CH_3-CH_2-$ |
| $-CH_2-CH_2-CH_2-$ | $CH_3-CH_2-CH_2-$ |
| $-CH_2-CH_2-CH_2-CH_2-$ | $CH_3-CH-CH_2-$<br>       $\|$<br>     $CH_3$ |
| $-CH_2-CH_2-CH_2-CH_2-CH_2-$ | $CH_3-CH_2-CH_2-CH_2-$ |
| $-CH_2-CH_2-CH-CH_2-$<br>               $\|$<br>             $CH_3$ | $CH_3-CH_2-CH_2-CH_2-CH_2-$ |
| $-CH_2-CH-CH_2-$<br>       $\|$<br>     $CH_3$ | $CH_3-CH-CH_2-CH_2-$<br>       $\|$<br>     $CH_3$ |
| $-CH_2-CH-CH-$<br>       $\|$   $\|$<br>     $CH_3$ $CH_3$ | $CH_3-CH-CH-$<br>       $\|$   $\|$<br>     $CH_3$ $CH_3$ |
| $-CH-CH-$<br>   $\|$    $\|$<br> $CH_3$ $CH_2-CH_3$ | |
| $-CH_2-CH-CH_2-$<br>       $\|$<br>     $CH_2-CH_3$ | |

Compounds of this invention are useful in various applications, including pesticidal uses. As used in the specification and claims, the terms "pesticide," "pests," and "pesticidal" are intended to refer to the killing and/or controlling of the growth of plants, bacteria, microorganisms, fungi, or the like. Thus, it will be appreciated that applications commonly termed bactericidal, herbicidal, fungicidal, or the like, are contemplated. Other uses of compounds of this invention include applications as monomers and polymers, solid rocket fuel components, e.g., binders, as coatings, films, fibers, intermediates, polymerization catalysts, high energy fuels, or fuel components, rocket fuel starters, plasticizers, stabilizers, and the like.

Specific and illustrative compounds of this invention are the following:

1-bromo-6,13,20,27,34,41,48,55,62,69,76-heptaheptacontaundecayne

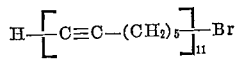

1-chloro-5,11-dodecadiyne

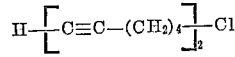

Compounds of this invention can be prepared by reacting with an excess of an alkylene dihalide an organometallic derivative of a polyacetylenic hydrocarbon. In practice, an organometallic derivative of a polyacetylenic hydrocarbon can be prepared by reacting a formed linear, non-conjugated α,ω-polyyne with a compound such as an alkali metal amide, e.g., sodium amide which is perferred, potassium amide, lithium amide, or the like; alkaline earth metal amide, e.g., calcium amide, strontium amide, barium amide, or the like; alkali metal hydrides, e.g., sodium hydride, potassium hydride, lithium hydride, or the like; alkaline earth metal hydrides, e.g., calcium hydride, strontium hydride, barium hydride, or the like; or Grignard reagents comprising alkyl magnesium halides, preferably ethyl magnesium bromide, the Grignard reagents being prepared by reacting an alkyl halide, e.g., ethyl bromide, with dry magnesium such as magnesium turnings. The reaction can be carried out in liquid ammonia, tetrahydrofuran, tetrahydropyran, ethyl ether or other alkyl ether, or hydrocarbon solvent such as pentane or hexane. When a Grignard reagent is formed, advantageous solvents include ethyl ether, tetrahydrofuran, tertiary amines, e.g., triethyl amine, tripropyl amine, or the like.

Preparation of the organometallic derivative of the polyyne generally can be carried out at a temperature from room temperature to about 150° C. with superatmospheric pressure if necessary or desired.

Alternatively, compounds of this invention can be prepared by reacting a metallic acetylide, e.g., a mono-, di-, or mixture of mono- and dimetallic acetylides or polyacetylides, such as monosodium acetylide (Na—C≡C—H)

disodium acetylide (Na—C≡C—Na), and/or polyacetylide (Na—C≡C—(CH₂)ₙ—C≡C—Na) or

Na—C≡C—(CH₂)ₙ—C≡C—H with an excess of an alkylene dihalide. This involves forming an organometallic derivative of the polyacetylenic compound in situ and reacting it as such with the alkylene dihalide. The alkylene dihalide can comprise two different halogen atoms, e.g., an alkylene chlorobromide, or can contain identical halogen atoms.

The preparation of compounds of this invention conveniently is carried out in liquid ammonia or other neutral, i.e., inert, solvent such as tetrahydrofuran, tetrahydropyran, ethyl ether or other alkyl ether, hydrocarbon solvent such as pentane or hexane, or tertiary amines such as triethyl amine, tripropyl amine, or the like.

Reaction temperatures are within the range from about —33° C. to 100° C., preferably about —20° C. Superatmospheric pressure can be employed if necessary or desired, e.g., up to about 1000 p.s.i.g., usually about 500 p.s.i.g.

In practice, such a reaction advantageously is carried out, via autoclave, in liquid ammonia under autogenous superatmospheric pressure sufficient to maintain the ammonia as a liquid, and at a temperature high enough to facilitate reaction, e.g., a temperature within the range from about —33° C. to 100° C., preferably —20° C. to 50° C. The pressure employed should be sufficient to maintain the ammonia as a liquid. Generally, a pressure of about 100 to 1000 p.s.i.g. is advantageous, typically about 400 to 600 p.s.i.g.

The reaction can, as indicated, be carried out by reacting in liquid ammonia, an excess of an alkylene dihalide with an organometallic derivative of a formed polyyne or, if desired, accomplished in situ during the formation of the desired polyyne, and then separated by distillation or other means. Thus, it will be appreciated that an alkylene dihalide can be reacted with a dimetal acetylide or polyacetylide and/or mixtures thereof with corresponding monometal acetylides and polyacetylides as indicated in Ser. No. 831,930, filed Aug. 6, 1959, and Ser. No. 769,583, filed Oct. 27, 1958, now Patent No. 3,052,734 (except that an excess of the dihalide is employed in order to form a halogen-terminated polyyne), wherein the preparation of various hydrogen-terminated, linear polyynes of the following type is described in detail, which description is hereby incorporated and made a part hereof:

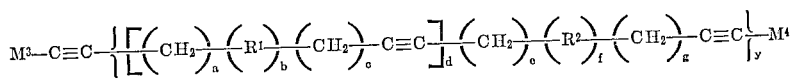

wherein M³ and M⁴ in this instance preferably, but not necessarily, are, hydrogen, R¹ and R² are as defined hereinbefore with respect to structure (I) $a$, $c$, $d$, $e$ and $g$ are each numbers from 0 to 20, inclusive; $b$ and $f$ are each numbers from 0 to 2, inclusive, with the proviso that when $b$ is 0 or 1, either $a$ or $c$, or the sum of $a$ and $c$, is equal to or greater than 3, and when $f$ is 0, the sum of $e$ and $g$ is equal to or greater than 3, and $y$ is a number from 1 to 100, inclusive.

Illustrative of the foregoing type of compounds useful as starting materials for the production of compounds of this invention, either as such, or during their preparation, are the following:

Acetylene
 (HC≡CH)
1,7-octadiyne
 (HC≡C—(CH₂)₄C≡C—H)
1,9,17-octadecatriyne
 (H—C≡C—(CH₂)₆—C≡C—(CH₂)₆—C≡C—H)
1,8,15-hexadecatriyne
 (H—C≡C—(CH₂)₅—C≡C—(CH₂)₅—C≡C—H)
1,7,13-tetradecatriyne
 (H—C≡C—(CH₂)₄—C≡C—(CH₂)₄—C≡C—H)
1,6,11-dodecatriyne
 (H—C≡C—(CH₂)₃—C≡C—(CH₂)₃—C≡C—H)
1,6,11,16-heptadecatetrayne
 (H—C≡C—(CH₂)₃—C≡C—(CH₂)₃—C≡C—
 (CH₂)₃—C≡C—H)
1,7,13,19-eicosatetrayne
 (H—C≡C—(CH₂)₄—C≡C—(CH₂)₄—C≡C—
 (CH₂)₄—C≡C—H)
1,8,15,22-tricosatetrayne
 (H—C≡C—(CH₂)₅—C≡C—(CH₂)₅—C≡C—
 (CH₂)₅—C≡C—H)
1,9,17,25-hexacosatetrayne
 (H—C≡C—(CH₂)₆—C≡C—(CH₂)₆—C≡C—
 (CH₂)₆—C≡C—H)
1,10,19,26-nonacosatetrayne
 (H—C≡C—(CH₂)₇—C≡C—(CH₂)₇—C≡C—
 (CH₂)₇—C≡C—H)
1,7,13,19,25-hexacosapentayne
 (H—C≡C—(CH₂)₄—C≡C—(CH₂)₄—C≡C—
 (CH₂)₄—C≡C—(CH₂)₄—C≡C—H)

While compounds of this invention may be employed in a variety of applications, biologically active or otherwise, when employed as biologically active materials it will be understood, of course, that such compounds may be utilized in diverse formulations, both liquid and solid, including finely-divided powders and granular materials as well as liquids such as solutions, concentrates, dispersions, emulsifiable concentrates, emulsions, slurries and the like, depending upon the application intended and the formulation medium desired.

These compounds may be used alone or in combination with other known biologically active materials such as other acetylenically unsaturated compounds, organic phosphate pesticides, fertilizers, chlorinated hydrocarbon insecticides, foliage and soil fungicides and the like.

Thus, it will be appreciated that compounds of this invention may be employed to form biologically active substances containing such compounds as essential active ingredients, which compositions may also include finely-divided dry or liquid carriers, extenders, fillers, conditioners, including various clays, such as talc, spent catalyst, alumina silica materials, liquids, solvents, diluents or the like, including water and various organic liquids such as benzene, toluene, chlorinated benzene, acetone, cyclohexanone, chlorinated xylene, carbon tetrachloride, ethylene dichloride, tetrachloroethylene, carbon disulfide, and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Other suitable surface active agents may be found in an article by John W. McCutcheon in Soap and Chemical Specialties, vol. 4, Nos. 7–10 (1955).

The term "carrier" as employed in the specification and claims is intended to refer broadly to materials constituting a major proportion of a biologically active or other formulation and hence, includes finely-divided materials, both liquids and solids, as aforementioned conveniently used in such applications.

In order that those skilled in the art may more completely understand the present invention and the preferred methods by which the same may be carried into effect, the following specific examples are offered:

EXAMPLE 1

*Preparation of 1-Chloro-5,11-Dodecadiyne*

PART A

A 10-gallon autoclave is charged with 7 gallons of anhydrous liquid ammonia, 507 g. (13 moles) of sodium amide, and with 2245 g. (20 moles) of 1,7-octadiyne while the contents are stirred and the temperature is kept below −33° C. Reaction is accomplished by the addition of 889 g. (7 moles) of 1,4-dichlorobutane. The autoclave is then sealed and the contents are stirred at −15° to −20° C. for 12 hours.

To isolate the desired product, the ammonia is evaporated and the residue treated with 1 gallon of water. This creates two layers. The desired product is in the upper layer. To purify the product layer, it is washed in succession with three half gallons of water, two half gallons of 3 N HCl, one half gallon of water, one half gallon of a 5% aqueous sodium carbonate, and finally dried over Drierite.[1] To isolate the desired product, the reaction mixture is fractionally distilled. Distillation at atmospheric pressure recovers 1170 g. (11 moles) of the starting 1,7-octadiyne, B.P. 135°–136° C. Products which boil higher weight 1051 g. Distillation under reduced pressure yields 284 g. of the desired product, B.P. 85°–87° C. at 0.1 mm. Hg, $n_D^{25}$=1.4812. The result of chemical analysis confirms the preparation of the desired $C_{12}H_{17}Cl$.

| Element | Actual (Percent by Weight) | Calculated (Percent by Weight) |
|---|---|---|
| C | 73.9 | 73.3 |
| H | 8.9 | 8.6 |
| Cl | 18.6 | 18.1 |

The molecular weight found is 183 and calculated 196.5. The infrared spectrum is consistent with the indicated structures.

PART B 1-chloro-5,11-dodecadiyne is examined for ability to inhibit the growth of three bacterial species (*Erwinia amylovora, Xanthomonas phaseoli,* and *Micrococcus pyogenes* var. *aureus* at a concentration of 250 p.p.m. The formulation [2] is diluted without maintaining the concentration of the emulsifier or solvent. The first two of above-named test species are Gram negative rods, the third species is Gram positive. They are all cultured on nutrient agar slants except *X. phaseoli* which is grown on potato dextrose agar. The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbimetric measurement. Each of three test tubes arranged in a rack receives one ml. of the 1250 p.p.m. test formulation. After the test formulations have been measured into a test tube 3½ ml. of distilled water and ½ ml. of bacterial suspension for each respective test organism is added to each test tube. The medication tubes are then set aside at room temperature for four hours. After this exposure period transfers are made by means of a standard four mm. platinum loop to 7 ml. of sterile broth into test tubes arranged in racks similar to those for the medication tubes. The broth tubes are then incubated for 48 hours at 29° C. at which time growth is measured by use of a Bausch & Lomb spectronic "20" direct reading colorimeter. A reading is recorded for each test tube after shaking. Three replicates of each organism serve as controls. Calculations are made on percent of the mean check readings. This figure subtracted from 100 gives percent control as compared to checks. The compound tested gives the following results.

Bacteria: Percent Control
   *X. phaseoli* _____ 64
   *E. amylovora* _____ 85
   *M. pyogenes* _____ 81

PART C

Paired, fully expanded seed leaves excised from Tendergreen bean plants are dipped into a test formulation [3] of 1-chloro-5,11-dodecadiyne and agitated until they are thoroughly wetted. The leaves are then dried. One leaf is placed in each of 5 oz. paper cups together with 10 randomly selected larvae; the cups are then covered with 9 cm. Petri dish covers. After three days at 70° F., mortality and feeding inhibition are determined. The results of such a procedure indicate a 100% mortality.

PART D

Further to illustrate insecticidal activity, 1-chloro-5,11-dodecadiyne, formulated as in Example 1, Part C, is tested

---

[1] Drierite is a trademark for anhydrous calcium sulfate.

[2] 0.1 g. test compound is combined with 4 ml. of acetone and 2 ml. of solution of 0.5% by volume of Triton X-155 in water.

[3] 0.1 g. of 1-chloro-5,11-dodecadiyne+4 ml. actone+2 ml. (0.5% by volume Triton X-155 in water) diluted with distilled water to provide a final concentration of 0.2%, 2000 p.p.m.

against the German cockroach (*Blatella germanica*). 75 ml. of the formulation is poured into a 150 ml. beaker containing 20 7 to 9-week-old male roaches anesthetized with carbon dioxide. The formulation is poured in and out three times and the roaches immediately screened and drained on towel paper. Ten of the thus-treated roaches are then placed in each of two paper cups. After three days, all roaches are dead.

PART E

To illustrate fungicidal activity of 1-chloro-5,11-dodecadiyne, inhibition of germination of *Sclerotium rolfsii* sclerotia, black blotting paper pads (2" x 2") are placed in a formulation as in part D but diluted to place about 800 g. of test chemical on each pad. Twenty sclerotia are exposed to each pad in a sealed bottle at room temperature. After 48 hours, a 100% growth inhibition is observed.

PART F

Further to illustrate fungicidal activity, 1-chloro-5,11-dodecadiyne [4] exhibits an ED-50 value (concentration that inhibits germination of half the spores) of 0.1 to 1.0 p.p.m. against *Alternaria oleracea*.

PART G

To illustrate nematocidal activity of 1-chloro-5,11-dodecadiyne, the following test procedure is carried out. Composed greenhouse soil diluted by one-third with clean washed sand is placed in ½-gallon glazed crocks and infested with three to five grams of knotted or galled tomato roots. Treatment is accomplished by mixing intimately with the soil a drench formulation consisting of four percent acetone, 0.01 prcent Triton X-155 emulsifier, 0.384 percent 1-chloro-5,11-dodecadiyne in a total volume of 100 ml. of water, all of which is drenched on the test crock. After treatment at a rate of 256 lbs. per acre, all crocks are stored at 20° C. and covered with plastic to maintain moisture. Seven days after treatment, three seedling Bonny Best tomatoes are transplanted into each crock. After three weeks in the greenhouse, the plants are carefully removed from the soil and the roots inspected for nematode galls. A 100% nematode control is achieved.

PART H

Further to illustrate nematocidal activity of 1-chloro-5,11-dodecadiyne, tests are conducted against the nematode (*Panagrellus redivivus*).

The nematodes are exposed to the test chemical in small watch glasses placed inside a 9 cm. Petri dish. Two watch glasses receive 0.4 ml. of the test formulation [5] at 1250 p.p.m. and the third, which is in the center between the others, receives 0.4 ml. of distilled water. After all of the test dishes have been set up in this manner, a 0.1 ml. of Panagrellus suspension [6] is added to each watch glass bringing the concentration down to exactly 1000 p.p.m. After these conditions are made the Petri dishes are closed. The watch glass in the center of each dish, containing only water and nematodes, detects fumigant action. The other two containing chemical and nematodes measure contact activity. The total amount of toxicant in the Petri dish is one mg. for fumigant action. By the foregoing procedure, a 100% kill is obtained both via fumigant and contact action.

[4] In a formulation consisting of 0.1 g. 1-chloro-5,11-dodecadiyne+4 ml. acetone+2 ml. (0.5% by volume Triton X-155 in water) diluted to a concentration of 1250 p.p.m.
[5] 0.1 g. test chemical+4 ml. of acetone+2 ml. (0.5% by volume Triton X-155 in water) diluted with distilled water to 1250 p.p.m.
[6] The organism is grown on cooked oatmeal which is sterilized in the autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours, mortality counts are made from which percent kill is determined.

EXAMPLE 2

*Preparation of 1-Bromo-6,13,20,27,34,41,48,55,62,69,76-Heptaheptacontaundecayne*

PART A

A 5-liter, three-necked flask is fitted with a mechanical stirrer and a reflux condenser containing a Dry-Ice-acetone mixture. The third neck is used for the addition of reagents. The flask is surrounded with vermiculite for thermal insulation.

Into this flask is introduced 3 liters of ammonia and 230 g. of sodium is converted to sodium amide (as described in "Inorganic Synthesis," 2, 128 (1946)).

A mixture of disodium acetylide and monosodium acetylide in the molar ratio of 7:1 is prepared by passing 5.33 moles of acetylene through the suspension of the sodium amide in ammonia. This is followed by a dropwise addition of 1150 g. (5 moles) of 1,5-dibromopentane.

The reflux condenser is then removed and the ammonia evaporated. The residue is diluted with 500 ml. of ethyl ether and 1000 ml. of water. Two layers are formed. The upper organic layer contains the desired product. It is washed in succession with two 100 ml. portions of water, three 100 ml. portions of 3 N HCl, two 100 ml. portions of water, two 100 ml. portions of a 5% solution of sodium carbonate in water, and, finally, dried with Drierite.

The dry ether solution is then fractionally distilled. Distillation at atmospheric pressure yields ether and 3.7 g. of 1,8-nonadiyne. Distillation under reduced pressure yields a fraction which boils at 110° to 115° at 0.1 mm. Hg and which contains 148 g. of 1,8-cyclotetradecadiyne that solidifies on cooling and melts at 100° C. The pot residue after the removal by distillation of the 1,8-cyclotetradecadiyne solidifies on cooling to yield 157 g. of a tan-colored, wax-like solid. The trituration of this solid with pentane yields the desired product in the form of a yellow powder that melts at 51°–53° C. The result of chemical analysis indicates preparation of the desired $C_{77}H_{111}Br$.

| Element | Actual (Percent by Weight) | Calculated (Percent by Weight) |
|---|---|---|
| C | 81.6 | 82.8 |
| H | 9.9 | 10.0 |
| Br | 7.2 | 7.2 |

The molecular weight found is 1122 while the calculated molecular weight is 1115. The infrared spectrum is consistent with the indicated structure.

PART B

Use of 1-bromo-6,13,20,27,34,41,48,55,62,69,76-heptaheptacontaundecayne in the procedure of Example 1, part B, indicates a 50% kill of *Xanthomonas phaseoli* at a concentration of 250 p.p.m.

What is claimed is:

1. A compound having the structure

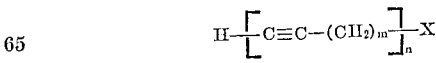

wherein X is halogen; $m$ is a number from 3 to 10, inclusive; and $n$ is a number from 2 to 20, inclusive.

2. A pesticidal composition comprising a major proportion of a carrier, a minor amount of a surface active agent and a pesticidal amount of a compound according to claim 1.

3. 1 - halo - 6,13,20,27,34,41,48,55,62,69,76 - heptaheptacontaundecayne.

4. 1 - bromo - 6,13,20,27,34,41,48,55,62,69,76 - heptaheptacontaundecayne.
5. 1-halo-5,11-dodecadiyne.
6. 1-chloro-5,11-dodecadiyne.
7. The method of producing a halogen-terminated polyacetylenic compound which comprises forming in situ an organo-metallic derivative of said polyacetylenic compound having terminal acetylenic groups and reacting said derivative with an amount of alkylene dihalide which is in excess of that required to completely react with the organo-metallic derivative.

References Cited in the file of this patent
UNITED STATES PATENTS
2,934,570   Goldberg et al. _____ Apr. 26, 1960